May 27, 1924.

E. E. CHURCHILL

LENS REPAIR STRAP

Filed June 1, 1922

1,495,469

INVENTOR:
Ernest E. Churchill
BY
ATTORNEYS.

Patented May 27, 1924.

1,495,469

UNITED STATES PATENT OFFICE.

ERNEST E. CHURCHILL, OF LONG BEACH, CALIFORNIA.

LENS-REPAIR STRAP.

Application filed June 1, 1922. Serial No. 565,221.

*To all whom it may concern:*

Be it known that I, ERNEST E. CHURCHILL, a citizen of the United States, residing at the city of Long Beach, in the county of Los Angeles, State of California, have invented new and useful Improvements in Lens-Repair Straps, of which the following is a specification.

My invention relates to a repair strap for repairing rimless mounted lenses when broken at the point where the nose piece or the temples are attached to the lens, and the object is to provide a strap that can be easily attached to the edge of a rimless lens at the point where broken so that it can be remounted and be as firmly held as it was before the lens was broken.

Figure 1:
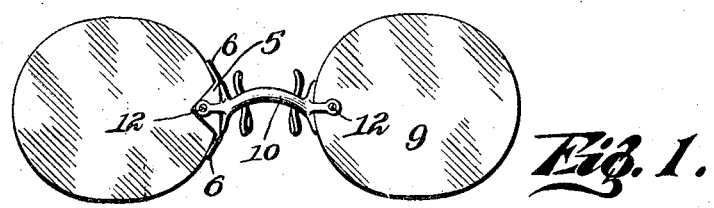
Figure 2:
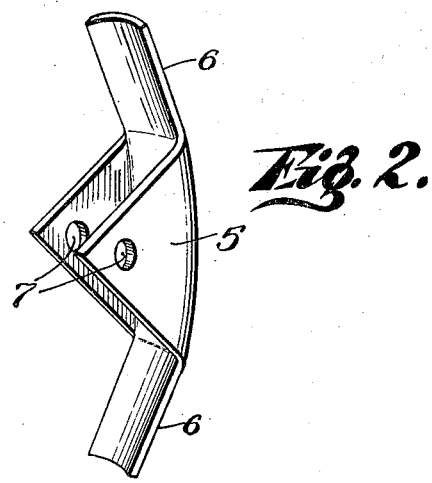
Figure 3:
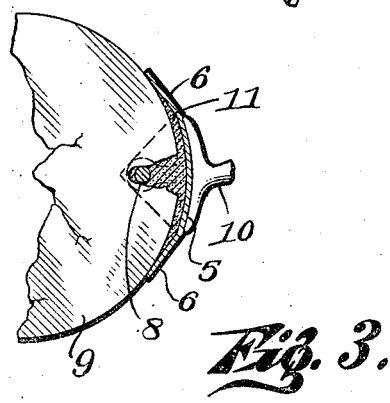

In the drawings forming a part of this application Fig. 1 is a front elevation of a pair of rimless glasses with one lens broken and repaired with my repair strap. Fig. 2 is a perspective view of my repair strap detached, the view being enlarged. Fig. 3 is an enlarged side view of a fragment of a broken lens, with the strap in section showing how it is attached to the lens with cement.

Referring to the drawings my repair strap consists of a U-shaped body 5 having wings 6 projecting from the back thereof. The sides of the body are pierced at points 7 that register with the hole 8 that is drilled through the lens 9 for the attachment thereto of the nose piece 10 or the end pieces for the temples when the wings are in contact with the edge of the lens. The strap is secured to the lens by cement 11. While I have shown the sides of the body triangular and the wings slightly curved it is obvious that they could be of other shape or length to fit the edge of the lens. The wings could be omitted, but by their use a better repair is effected. After the strap is attached to the lens and the cement set, the nose piece 10 or a spectacle mounting is secured by the screws in the usual way.

Having described my invention I claim.

1. A repair strap for repairing spectacles and eyeglasses comprising a metal U-shaped body member adapted to enclose a notch shaped break in the end of a lens and engage the sides of the lens and hold cement in such notch, said body being pierced in the side walls at points which register with the hole in the lens that held the screw which connected the nose or bow piece to the lens, whereby when the cement hardens the bow or nose piece may be again attached to the lens.

2. A repair strap for repairing spectacles and eyeglasses comprising a metal U-shaped body member adapted to enclose a notch shaped break in the end of a lens and engage the sides of the lens and hold cement in such notch, said body being pierced in the side walls at points which register with the hole in the lens that held the screw which connected the nose or bow piece, and wings projecting from the ends of the back of the body piece adapted to hold cement in engagement with the edges of the lens, whereby when the cement hardens the nose or bow piece may again be attached to the lens.

In witness that I claim the foregoing I have hereunto subscribed my name this 1st day of May 1922.

ERNEST E. CHURCHILL.